June 20, 1967    R. H. GRIMOLDI ET AL    3,325,895
PORTABLE CUTTING APPARATUS
Filed Feb. 15, 1965    6 Sheets-Sheet 1

INVENTOR.
RANOLDO H. GRIMOLDI
JOSEPH E. POWERS
BY James E. Tooney
ATTORNEY

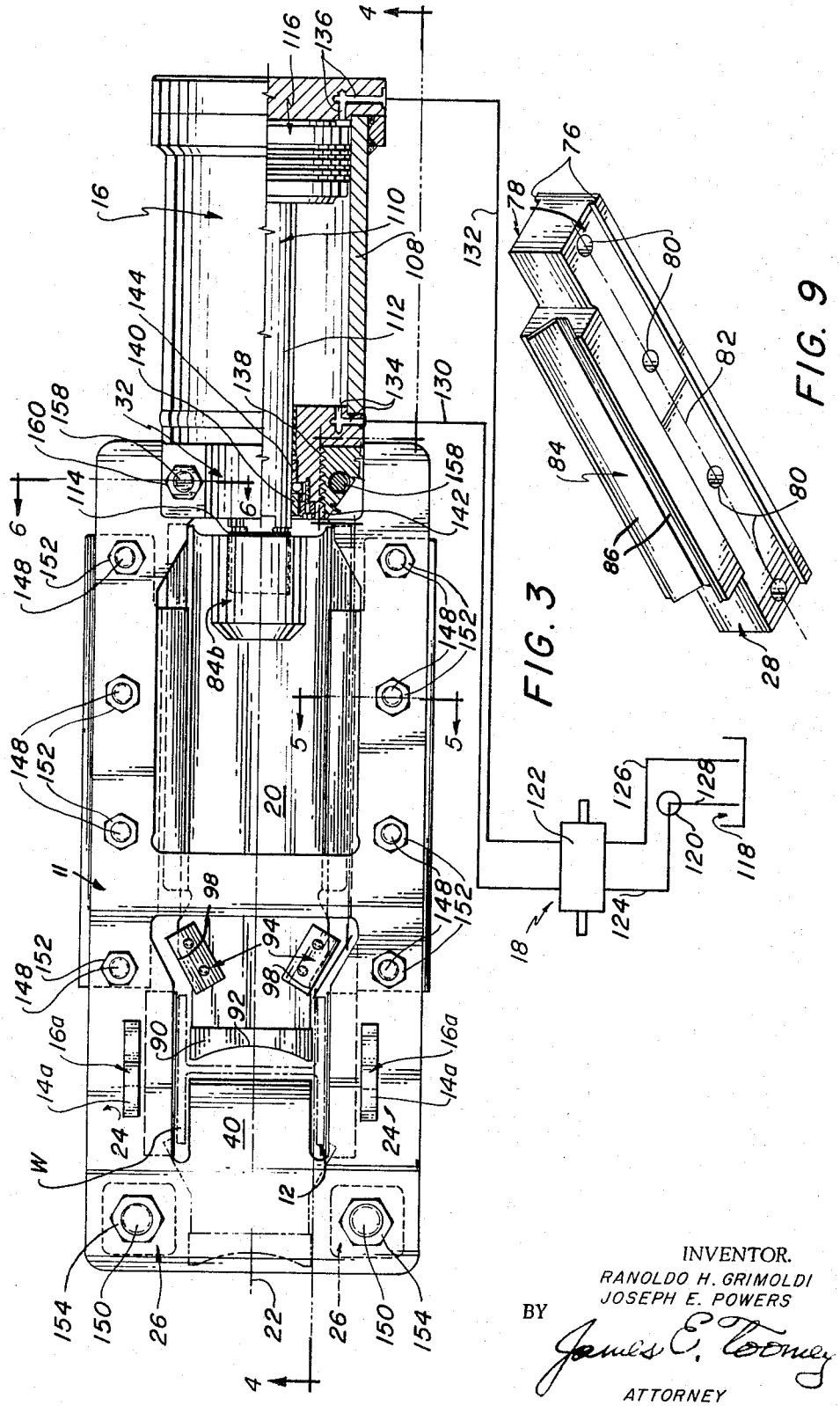

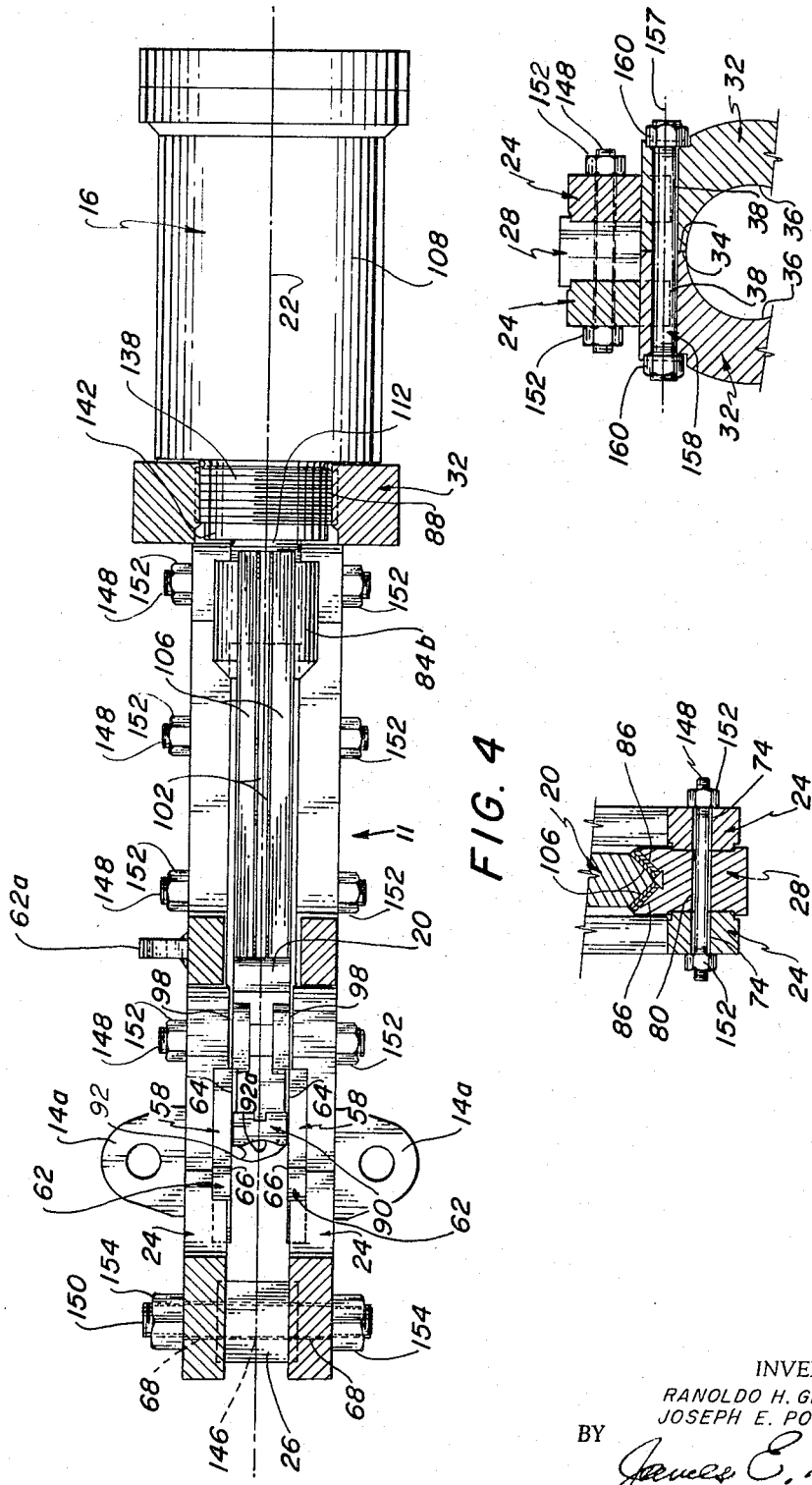

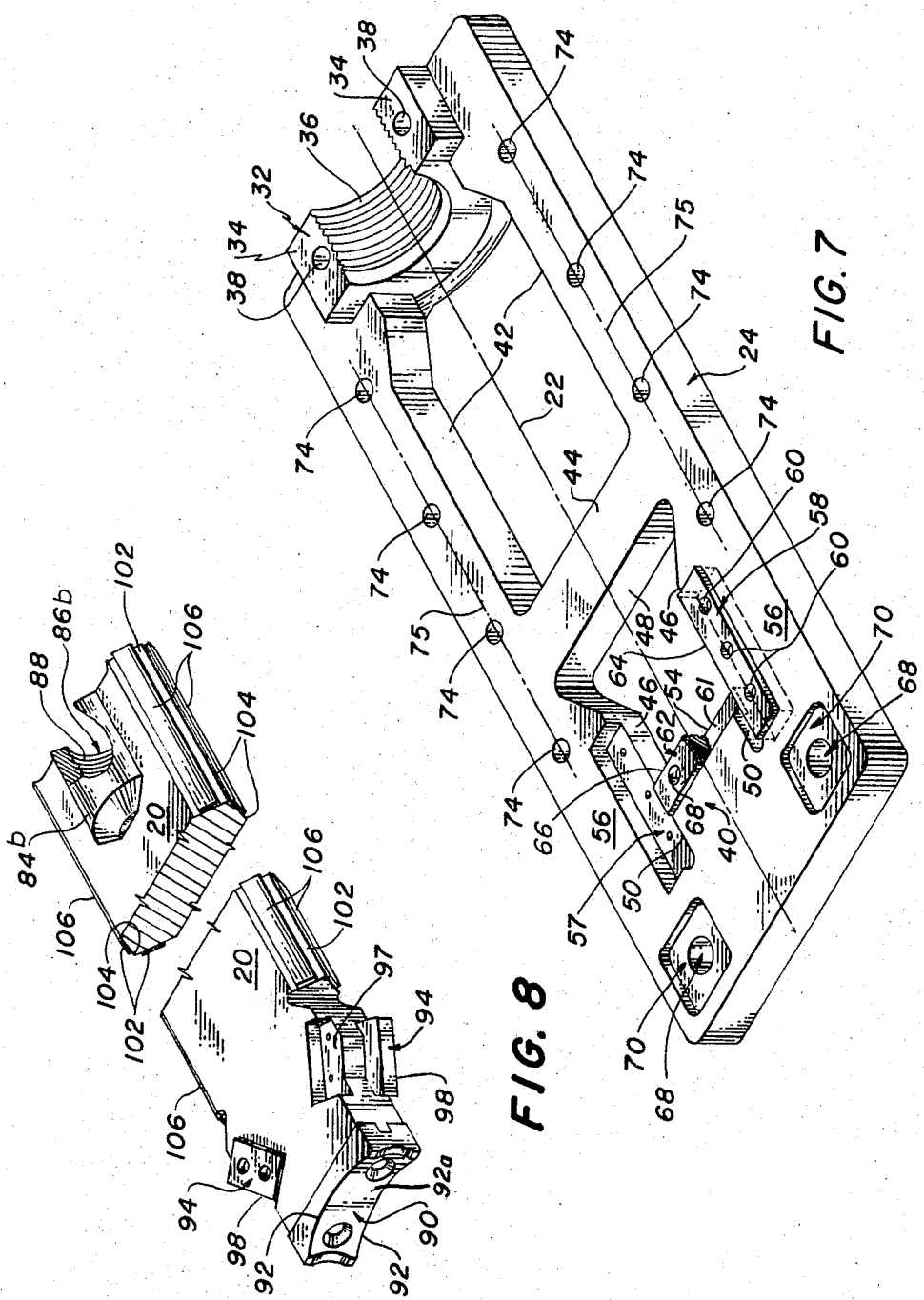

INVENTOR.
RANOLDO H. GRIMOLDI
JOSEPH E. POWERS
BY
ATTORNEY

United States Patent Office  3,325,895
Patented June 20, 1967

3,325,895
PORTABLE CUTTING APPARATUS
Ranoldo H. Grimoldi and Joseph E. Powers, Napa, Calif., assignors to Kaiser Steel Corporation, Oakland, Calif., a corporation of Nevada
Filed Feb. 15, 1965, Ser. No. 432,524
12 Claims. (Cl. 30—228)

This invention relates to a portable apparatus for cutting a workpiece into sections. More particularly, this invention relates to an improved portable apparatus wherein the apparatus is adapted to act in a unique fashion as a holder for the workpiece during severing of the workpiece in a unique fashion into sections upon the advancement of a shear blade or the like disposed within the framework of the apparatus.

Accordingly, the primary purpose of the instant invention is to provide an improved portable cutting apparatus wherein novel means are employed to maintain the apparatus in a workpiece engaging condition and at predetermined angular relation relative to a workpiece being cut but a unique shear means mounted upon the apparatus.

This and other purposes and advantages of the instant invention will become more apparent from a review of the following detailed description when taken in conjunction with the appended drawings, wherein:

FIG. 3 is a plan view of the apparatus of FIG. 1 with certain parts removed and other parts broken away to illustrate further details of the apparatus of the instant invention and includes a diagrammatic showing of a suitable fluid control system therefor;

FIG. 4 is a sectional view generally taken along line 4—4 of FIG. 3 without the workpiece being shown and with the cutting blade being shown in an intermediate stroke position;

FIG. 5 is a sectional view generally taken along line 5—5 of FIG. 3 and illustrates the relationship of certain of the assembled parts making up the frame of the apparatus at intermediate portions thereof;

FIG. 6 is a sectional view generally taken along line 6—6 of FIG. 3 and illustrates the relationship of certain of the assembled parts making up the frame of the apparatus at the actuator end thereof;

FIG. 7 is a perspective view of one of the elements making up the frame of the device and illustrates further details thereof;

FIG. 8 is a fragmentary perspective view on an enlarged scale of a cutting blade used in the apparatus of the instant invention;

FIG. 9 is a perspective view of a spacer element that is used to mount the shear blade for slidable movement upon the apparatus of the instant invention;

Figure 1:
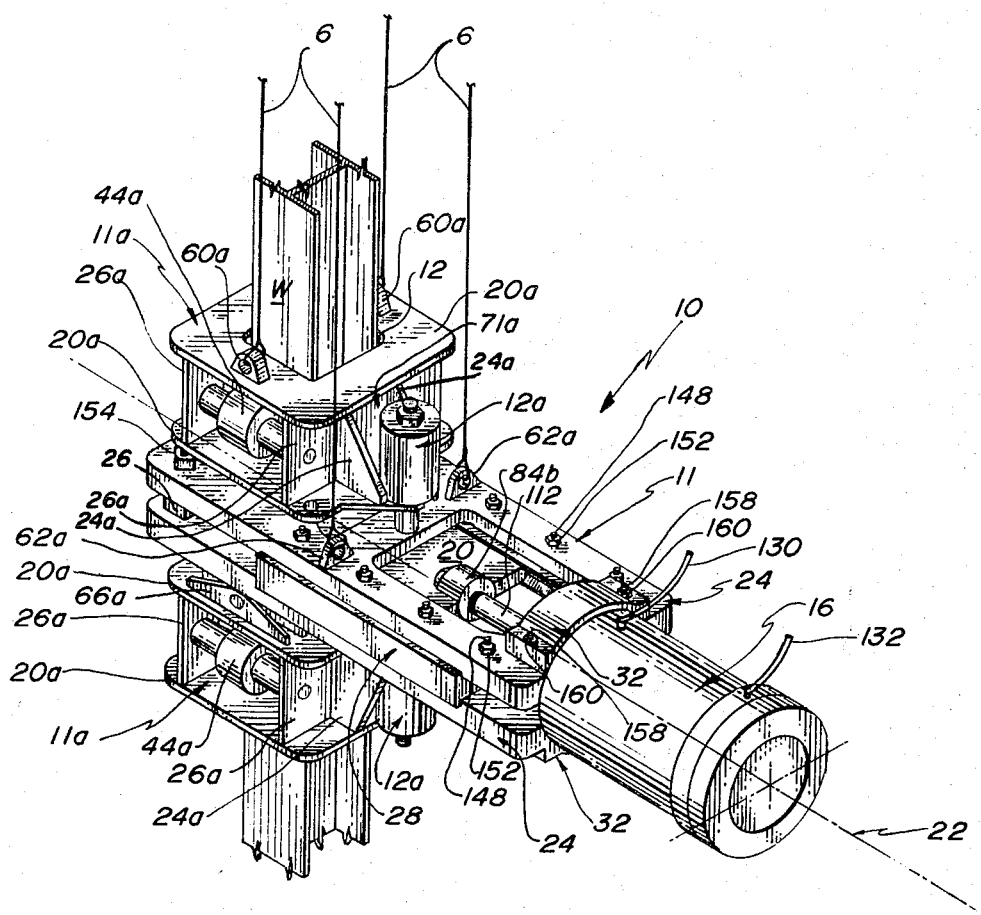
FIG. 1 is a perspective view of a preferred embodiment of the apparatus of the instant invention which is suspended in an operative position relative to a workpiece.
Figure 2:
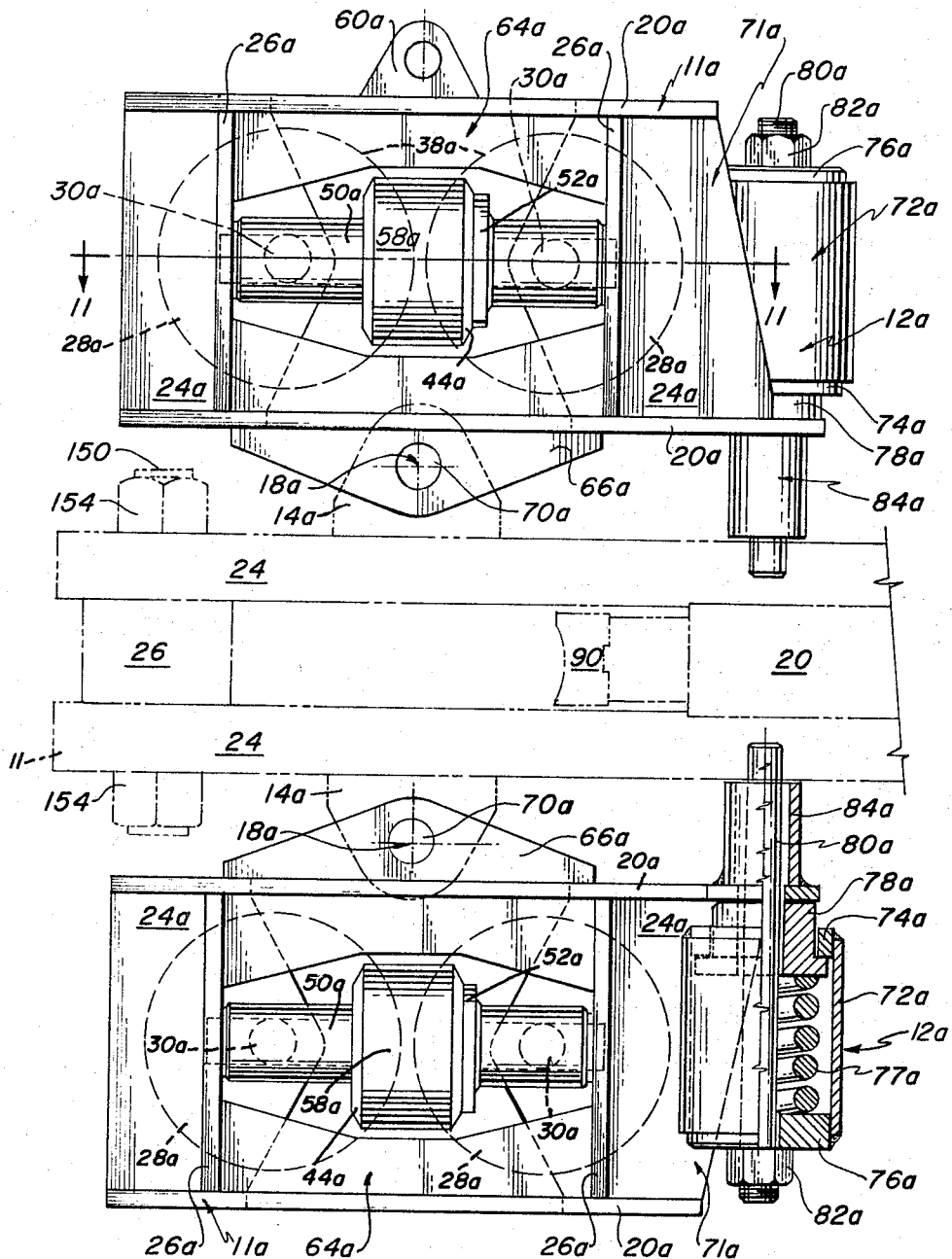
FIG. 2 is an elevational and partly sectional view generally taken along line 2—2 of FIG. 11 and with certain parts broken away, other parts removed and other parts shown in dotted lines.

With further reference to the drawings and, in particular, FIGS. 1-2 a preferred form of the apparatus that can be used in carrying out the teachings of the instant invention generally comprises a framework 10 made up of a series of suitably secured plate members.

The framework 10 generally comprises a pair of guide members or elements 11a pivotally and resiliently connected to opposite sides of an intermediate rigid frame 11 in such a fashion that the guide elements 11a and the rigid frome 11 are provided with a common opening or passageway, generally indicated at 12. This passageway permits the framework 10 to be positioned about and along a workpiece W whereby the apparatus through its common opening 12 can freely encircle the workpiece W such as an I-beam.

As one preferred means of controllably suspending the apparatus 10 relative to the workpiece W from a remote position or control station, not shown, a series of cables 6 can be suitably connectetd to the apparatus 10 in the manner shown in FIG. 1. As best shown in FIG. 2, each pivotally and resiliently connected guide means 11a includes a separate means generally indicated at 12a for resiliently connecting the guide elements to a selected side of the frame 11. As will become more apparent hereinafter, the purpose of the resilient means 12a is to bias the pivotal connection of the associated guide means 11a to the frame 11 in such a fashion that both resiliently biased guide means 11a advantageously cooperate to maintain the rigid frame 11 of the apparatus 10 in a predetermined angular relation with respect to the encircled workpiece W. Frame 11 is generally made up of a pair of identical frame members 24 held in spaced relation by a series of spacer elements or members 26 and 28. A shear blade 20 is suitably arranged for reciprocatory movement on frame 11, the movements of blade 20 being controlled by an actuator mechanism 16 disposed at one end of the frame. The open portion of the frame 11 adjacent the other end thereof forms an intermediate part of the opening 12 through the apparatus 10 so that when the apparatus encircles a workpiece and is positioned at a predetermined point along the workpiece W in FIG. 1, actuation of the shear blade 20 towards the encircled workpiece W will result in an effective cutting of the workpiece W into the desired sectional lengths.

The guide means 11a are pivotally affixed to the frame 11 by a pair of spaced parallel ears 14a that are suitably affixed such as by welding to the upper surface of each frame member 24 as illustrated in FIGS. 2–4. Ears 14a are provided with openings 16a therethrough which are advantageously aligned along a common axis 18a as shown in FIG. 3 that substantially coincides with an axis passing through the web of the I-beam workpiece W when the workpiece W is disposed in the opening 12 of the apparatus 10. Since both guide means 11a are identical in structure, a description of one will suffice for both. The manner of assembly of a guide means as set forth below is not to be considered limiting, but merely illustrative of one such arrangement.

Figure 11:
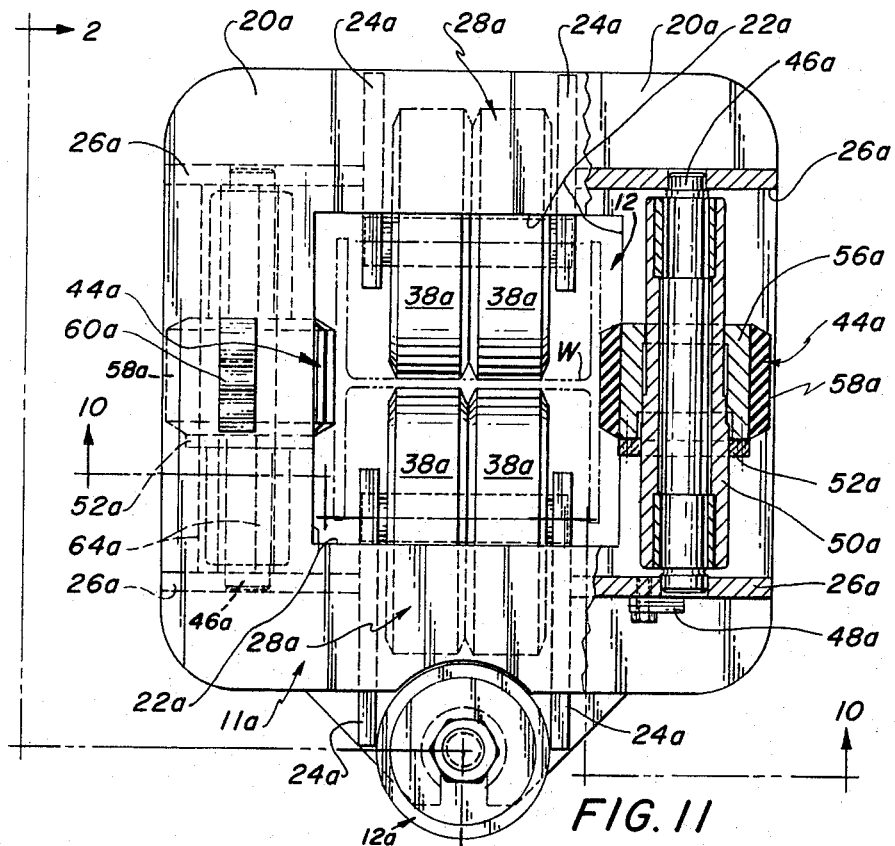
FIG. 11 is an end view of the apparatus of FIG. 10 with certain parts broken away and other parts being shown in section and when taken generally along line 11—11 of FIG. 2.

As indicated in FIG. 11, the upper and lower plates 20a of the guide element 11a have their intermediate portions cut out to define surrounding intersecting surfaces 22a. These intersecting surfaces 22a as shown in the upper plate 20a in FIG. 11 define a square shaped opening through the body portion of the guide element 11a that forms part of the general opening 12 through the apparatus 10 of the instant invention. The plate members 20a are held in parallel spaced relation by a series of plate members 24a extending between the opposed inner faces of the spaced plates 20a. To this end, separate pairs of spaced spacer plates 24a extend between the outer plates 20a on two of the opposite sides of the plates 20a with each pair of plates 24a on each side disposed in parallel relation to each other. A roller means 28a is advantageously assembled to extend between each pair of plates 24a. Each roller means 28a, one of which is shown in partial section in FIG. 10, generally comprises a shaft 30a extending between aligned apertures in each of the parallel disposed plates 24a, wherein the shaft is affixed to one of the plate members 24a by means of a bolt-fastened retainer plate 32a. A hub 34a provided with internal sleeve bearings is rotatably mounted to the shaft 30a between the inside faces of the plates 24a. The outer cylindrical surface of the hub 34a includes axially spaced rim portions 36a. These rim portions 36a permit connection of two wheels 38a in tandem fashion. The wheels 38a have supporting rim portions 40a provided with inner annular projections that are adapted to align with the stepped periphery of the spaced hub rim portions 36a. Such alignment enables rigid connection of a pair of wheels 38a by means of a plurality of circumferentially disposed fastening bolts 42a.

From the above description, it is evident that the roller means 28a advantageously provides for the periphery of each set of tandem mounted wheels 38a to be in tangential contact with a surface of the web portion of the I-beam W as illustrated in FIG. 11.

Figure 10:
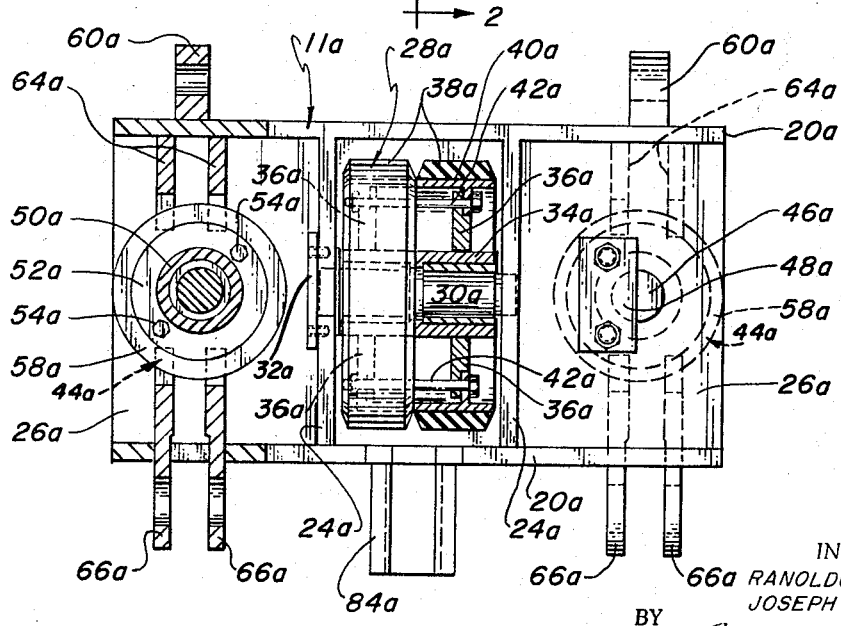
FIG. 10 is an elevational sectional view of the apparatus when taken generally along line 10—10 of FIG. 11.

The remaining two opposite sides of the spaced outer plates 20a have separate pairs of parallel spaced plates 26a, affixed thereto and extending therebetween. In other words, each remaining side has a pair of parallel spaced plates 26a extending therebetween wherein each plate 26a making up the pair on each side of plate 20a has its inner edge disposed in abutting relation with an intermediate portion of the outer face of the adjacently affixed spacer plate 24a extending between the other two sides of the outer plates 20a as manifested in FIG. 11. When these plates 26a are affixed to extend between the outer plates 20a a roller means 44a is mounted to extend between aligned apertures in each pair of affixed parallel spaced plates 26a. As best shown in FIGS. 10 and 11, the roller means 44a includes a shaft 46a extending between parallel spaced plates 26a with the shaft 46a being affixed at one end to an associated plate 26a by means of a bolt-fastened retainer element 48a. A hub 50a including internal bearing sleeves at each end is rotatably mounted on the shaft 46a and extends between the inner faces of the parallel affixed plates 26a. As shown in FIGS. 10–11, the intermediate portion of the hub 50a includes a radially projecting hub portion 52a that has an arm portion 56a assembled thereto by means of cap screws 54a. The rim portion 56a constitutes an integral part of the wheel 58a. The peripheral surface of wheel 58a of each roller means 44a tangentially contacts the outer surface of one of the flange portions making up the I-beam W. It is to be observed here that the tangential contact of all wheels 38a and 58a with their respective outer surface of the I-beam is preferably disposed in a common horizontal plane that also passes through the longitudinal axis of each roller means 28a or 44a as the case may be. Accordingly, the roller means 28a and 44a in each guide element 11a are in tangential contact with the outer surfaces of the workpiece at a common point therealong.

While the wheels 38a of the roller means 28a are in rotatable contact with opposite surfaces of the web portion of the I-beam W, the inner edges of the plates 24a extend into the opening between the flange portions of the I-beam W. Since the inner edges of the plates 24a extend into the opening 12, minimal obstruction to movement of the apparatus 10 relative to the encircled workpiece W will be obtained by beveling the inner edges of these plates 24a in the manner shown by the dotted and solid lines in FIG. 2. Although not heretofore mentioned, the outermost plate 20a of the uppermost guide element 11a of FIG. 1 has a pair of spaced ears 60a affixed thereto. These ears have openings for connection to the cable means 6. Another pair of ears 62a is affixed to the upper surface of the uppermost frame member 24 making up the frame in FIG. 1 for connection to the remaining pair of cable elements 6.

To further rigidify the body portion of the guide element 11a reinforcing plates 64a are affixed to the under surface of the upper plate 20a. Each plate 64a extends between the inner oppositely facing surfaces of the parallel plates 26a as shown in FIGS. 2 and 10–11. The inner free edges of plates 64a are recessed to provide sufficient clearance for the roller means 44a.

The bottom plate 20a of the guide element 11a is similarly provided with reinforcing plates 66a which extend between the opposing inner faces of the aforesaid parallel plates 26a. In this instance, however, an opening has been cut into the bottom plate 20a so that the plates 66a can extend above and below this bottom plate. The upper portion of plates 66a have their free edges recessed in a similar fashion as the other reinforcing plates 64a to thereby provide sufficient clearance for the roller means 44a. The lower portion of the reinforcing plates 66a, however, extend downwardly to provide pivotal connection with the ears 14a on the upper surface of a frame member 24.

The downwardly projecting portion of all the plates 66a have a common aligned opening therethrough that is aligned with the opening through the spaced ears 14a in order that the pair of plates 66a on each side can overlap the respective ears 14a. When a separate pin 70a is passed through the aligned openings of the overlapping plates 66a and the ears 14a on each side of a frame member 24, the guide element 11a will be pivotally connected to a frame member 24 about the axis 18a.

The guide elements 11a in addition to their pivotal connection aforedescribed to a frame member 24 of the frame 11 are also advantageously resiliently connected to a frame member 24 by a coil spring means 12a independently mounted to one side of the body portion of the guide element 11a. To this end, one pair of the aforedescribed spacer plates 24a on one side of the body portion of the guide element 11a are disposed intermediate the top and bottom plates 20a. The bottom plate 20a is also laterally extended to intersect the outward-most extensions of spacer plates 24a. These extensions generally indicated at 71 in FIG. 1 permit mounting of the coil spring means 12a.

The resilient means or stabilizers 12a best shown in FIG. 2 includes a hollow cylindrical body or housing 72a closed at both ends by end plates 74a and 76a both of which have different sized concentric openings therethrough such that the larger concentric opening in the end plate 74a can permit the passage therethrough of a plunger 78a with its flanged end disposed inside of the cylindrical body 12a and in abutting relation with the inner surface of the end plate 74a. A coil spring 77a of suitable construction is disposed between the inner surfaces of the plunger 78a and the end plate 76a. The bottom plate 20a has a cylindrical spacer element 84a affixed to the outer surface thereof. Element 84a is adapted to extend between the outer surface of the bottom plate 20a and that of the adjacent frame member 24.

When the guide element 11a is pivotally affixed to the frame member 24 as aforedescribed, the resilient means 12a can be assembled to the frame member 24 and connected to the guide element 11a in the following manner. A bolt 80a with a conventional nut 82 is passed through the aligned openings in the cylindrical body portion 72a, end plates 74a and 76a and plunger 78a. Then with the resilient means 12a freely assembled to the bolt 80a the bolt 80a is passed through the aligned openings in the bottom plate member 20a and spacer element 84a whereby the free end of the bolt 80a can be threadably connected to a closed end bore disposed in the adjacent frame member 24 as shown in FIG. 2 and thereby provide resilient connection of the plunger 78a of the assembled resilient means 12a against the bottom plate 20a of the associated guide element 11a. The outer end of the plate member 20a as well as the spacer element 84a have been longitudinally slotted so that the guide element 11a can be easily disconnected from the resilient means 12a by reducing the force of the resilient connection between the plunger 78a and bottom plate 20a upon adjustment of the nut 82a in the usual manner. From the above description it is believed obvious that whenever the pivotally and resiliently connected guide element 11a attempts to pivot about its axis 18a the spring biased plunger 78a resists such pivotal movement and thereby maintains the guide element in a predetermined angular relation to the frame 11. Hence, by virtue of the spacer element 84a extending between the bottom plate 20a of the guide element 11a and the outer surface of the adjacent frame 24, each guide element 11a is preferably biased and maintained at an angle of 90° to the associated guide element.

Referring now to the frame 11 made up of identical frame members 24 disposed between the guide members 11a, these frame members 24 will now be described. Inasmuch as the frame members 24 are identical, a description of one will suffice for both. One of the frame members 24 is shown in detail in FIG. 7. It has a shape in plan roughly approximating the shape of the letter A. The open end 30 thereof is closed off by a semi-circular cap 32. The concave side of the cap 32 has a pair of flat surfaces 34 interconnected by an arcuate surface 36 that is corrugated or threaded to facilitate connection of the actuator mechanism 16 as hereinafter described. A pair of openings 38 extend through the cap 32 such that one end of each opening 38 intersects one of the surfaces 34 as shown in FIG. 7. The other longitudinal end of the frame 24 includes an inwardly projecting portion 40. The intermediate reinforcing bar member 44 of the member 24, the projecting portion 40 and the adjacent portions of legs 42 define an opening which forms part of the overall passageway 12 of the apparatus. More specifically the aforesaid opening is defined by surfaces 46 of the leg portions, surface 48 of the bridge member and surfaces 50 and 54 of the inwardly projecting portion 40.

Portions of the inner planar surface 56 of the frame 24 as well as portions of the surfaces 46 have been cut away along their common intersecting longitudinal edges to define opposed recesses 57. Insertable cutting elements 58 are disposed and anchored in these recesses in the usual manner by means of Allen-head screws 60. Only one cutting insert 58 is mounted in one of the recesses. Similarly portions of the surfaces 56 and 54 have been cut away at their common intersecting edge to define a recess 61 disposed transversely to the other recesses 57 and extending therebetween. For the sake of brevity and clarity a similar insertable cutting element 62 is only partially shown as being affixed within the recess by Allen-head screws 68 in the usual manner. The indicated edges 64 and 66 of the cutting inserts 58 and 62 constitute cutting edges.

The end of the frame 24 opposite the actuator end is provided with openings 68 extending therethrough. These openings 68 are recessed adjacent the inner planar face 56 by means of a counterbore 70 that is of square shape. Each leg member 42 also has a series of equally spaced circular openings 74 which are aligned along a common longitudinal axis 75.

The spacer members 28, one of which is shown in FIG. 9, approximates the shape of a letter T in plan. The opposite planar surfaces 76 thereof have been partially cut away to define a longitudinally extending recess 78. A series of equally spaced openings 80 extend along a common longitudinal axis 82 between opposed surfaces of the recess and they are adapted to align with the openings 74 in the frame members 24 as will be subsequently described. The inner edge portion of the spacer member 28 has a V-shaped guide 84 affixed thereto in the manner illustrated such that each inclined surface of the V-shaped guide 84 has a bearing insert 86 affixed thereto in a conventional manner.

The blade member 20 shown in detail in FIG. 8 is preferably made in one piece. One end thereof is partially cut away to facilitate connection of a cylindrical plug 84b thereto. The free end of the plug 84b includes a closed end bore 86b defined by an internal cylindrical surface 88 which has been threaded for the connection of the threaded piston rod end of the actuator mechanism 16 as will be subsequently described. The forward end of the blade member 20 necks down and has a series of insertable cutting inserts connected thereto which are arranged in offset relation to each other. A renewable cutting element 90 is removably mounted to the forwardmost end of the blade member 20. To this end the rear face of the element 90 has been longitudinally recessed to provide proper alignment with a corresponding protrusion on the forward end of the blade member 20 in FIG. 2. Element 90 has spaced cutting edges 92 desirably of arcuate shape connected by an arcuate bridge portion 92a wherein proper relief is provided between the cutting edges 92. In other words, the front portion of element 90 is indented in the manner of a sphere. A pair of recesses 97 are disposed rearwardly of insert 90 along each longitudinal edge and on opposite sides of the blade 20. These recesses 97 provide a means for mounting additional cutting elements 94, two of which are shown. These recesses are disposed in angular relation to the longitudinal axis of blade 20. When the inserts 94 are mounted in their recesses 97 it is now obvious that their cutting edges 98 thereof will cooperate with cutting elements 58 on the frame member 24 during the forward stroke of blade 20.

The longitudinal edges of the blade member 20 disposed between the end of the insertable blades 94 and the actuator end of the blade member 20 have been beveled to define convergent wall surfaces 102. These convergent wall surfaces 102 cooperate with the V-shaped guide 84 on the spacer elements 20a to permit movement of the blade member in opposite directions along the longitudinal axis of frame 24. The convergent wall surfaces 102 also include bearing inserts 106 that engage bearing surfaces 86 on the guides 84.

The actuator mechanism 16 best shown in FIGS. 3–4 comprises a closed end cylinder 108 enclosing a piston rod assembly 110. The piston rod 112 therefor extends through one end of the cylinder 108 in a suitable fashion and the free end of the piston rod 112 is threaded at 114 to facilitate its connection with the threaded surface 88 of the plug end of the blade member 20. The other end of the rod 112 within the actuator mechanism is connected to a piston 116 of suitable design which is adapted to be moved between the ends of the cylinder 108 by the control means 18. The control means 18 includes a source of fluid 118, a pump 20 and a control valve 122 interconnected to each other in the manner shown in FIG. 3 by the conduits 124, 126 and 128. The control valve 122 is further connected to either side of the piston 116 and the cylinder 108 by conduits 130, 132 and passageways 134, 136 disposed at either end of the cylinder 108. Thus, if fluid under pressure is directed through conduit 132 from selective operation of the control valve 122 in a suitable manner, the piston 116 is moved to the left in FIG. 1 to thereby correspondingly move the blade member 20 while fluid on the rod side of the piston is exhausted through passageways 134, 130 and 126 to return to the source 118. Similarly, the control valve 122 can be selectively operated to direct fluid under pressure through conduit 130 and exhaust pressure fluid through conduit 132 whereby the piston rod is retracted into the cylinder causing corresponding retraction of the blade member 20.

To enable the rod end of the cylinder 108 to be connected to the caps 32 of the frames 24 the rod end of the cylinder is reduced and threaded at 138. Furthermore, to prevent leakage of fluid within the cylinder 108 a conventional annular seal 140 is disposed between the piston rod 112 and the reduced end of the cylinder 108. The seal 140 is secured in position by means of an annular retainer 142. A bearing 144 is disposed inwardly of the seal 140 to minimize friction between the rod 112 and the rod end of the cylinder 108.

The frames 24 are spaced from each other by means of the spacer elements 26 and 28 so that the recesses 78 of each spacer element 28 are in direct contact with the planar surfaces 56 of the spaced frame members 24. Upon positioning of the spacer elements 28 the other spacer elements 26 are then disposed with their ends in the counterbore 70 of the spaced frame members 24 in a suitable manner. With one opening 74 of each spaced frame member 24 in vertical alignment with one opening 80 in the guide member 28, a bolt 148 reversibly threaded at each end can be passed through the aligned openings 74 and 80 as shown in FIG. 5. Similarly threaded bolts 148 can be passed through the remaining common aligned openings 74 and 80 respectively of the frame members 24 and the spacer elements 28. Conventional nuts 152 are then connected to the reversibly threaded ends of the bolt 148 i.e. a bolt having a left-hand thread at one end and a right-hand thread at the other such that securement of the nuts against the outer face of the frame members 24 results in rigidly connecting together the spacer elements 28 and the frame members 24.

Although not heretofore described, the other spacer elements 26 include openings 146 therethrough such that when the ends of the spacer blocks are disposed in the spaced counterbores 70 of the spaced frame members 24 the openings 68 in each frame are in alignment with the associated opening 146 in the inserted spacer block 26. Then when a bolt 150 also reversibly threaded at its ends as noted above is inserted through the common aligned openings 68 and 146 respectively of the frame members 24 and spacer block 26 the frame members 24 can be firmly secured to the spacer element 26 upon connection of conventional nuts 154 in the usual manner as shown in FIGS. 3–4. It is further noted here that when the frame members 24 are being assembled to the spacer elements 28 in the manner aforedescribed the blade member 20 is disposed in engagement with the V-shaped guide 84 of each spacer element 28 so that upon bolt fastening of the frame members 24 together the longitudinal edges, defined by surfaces 102, of the blade member 20 will be disposed in the V-shaped guides 84 for stroke movement in opposite directions between the ends of the frame 11.

Upon the fastening together of the frame members 24 and spacer elements 26 and 28 by the bolts 148 and 150 as aforedescribed the actuator mechanism 16 can now be connected to the cap 32 of the frame members 24 as well as to the plug end of the blade member 20. By virtue of the frame members 24 and spacer elements 26 and 28 being fastened together the caps 32 are now held in aligned relation with their inner faces 34 being in abutting contact and with the openings 38 in each flanged cap 32 being in alignment along a common axis 157 such as shown in FIG. 6. Separate bolts 158 reversibly threaded at their ends can be passed through the pair of aligned openings 38 so that the caps 32 can be securely clamped together upon connection of conventional nuts 160 at the outer ends of the spaced bolts 158. Prior to securely clamping the caps 32 by means of the bolts 158 the actuator mechanism 16 has its threaded rod end 138 brought into engagement with the threaded surfaces 36 of the aligned caps 32. The piston rod end 114 at the same time is brought into threaded engagement with the threaded surface 88 of the plug 84b on the blade 20.

It will now be observed that when the apparatus 10 is positioned over an end of the workpiece the workpiece will readily pass through passageway 12 and the apparatus lowered about or moved along the workpiece by means of the aforedescribed cables 6 until the apparatus 10 is located at a predetermined point along the workpiece where the workpiece is to be severed into sections. In moving the apparatus 10 along the workpiece W the pivotally and resiliently connected elements 11a advantageously cooperate, by virtue of their tangentially contacting roller means 28a and 44a on the surface of the workpiece, to maintain the frame 11 which supports the cutter blade 20 in substantially a predetermined angular relation with respect to the outer surface area of the workpiece.

Once the apparatus 10 has been positioned by the suspended cable means 6 at a predetermined location relative to the workpiece actuation of the mechanism 16 is effected by its control circuit 18 for forward stroke movement of the blade 20. Forward movement of blade 20 results in cooperation of the cutting edges 92 and 98 of the inserted elements 90 and 94 with the cutting edges 66 and 64 on the cutting elements 62 and 58 on the spaced frame members 24 in such a fashion that when the cutting blade 20 has reached its forwardmost position as indicated by the dotted lines in FIG. 3 the cutting blade 20 severs a section from the workpiece. During and immediately prior to cutting of the workpiece the workpiece engaging surfaces 54 of the frame members 24 cooperate in a unique fashion with cutting elements 90 and 94 on the blade 20 to clampingly secure the entire apparatus 10 to the workpiece. In other words, the stroke advancement of the blade member 20 upon initial engagement with the workpiece causes the surfaces 54 of the spaced frame members 24 to forcefully engage surface portions of the web of the workpiece immediately adjacent the section to be severed from the workpiece to thereby clampingly engage the apparatus 10 to the workpiece W. Such clamping engagement is maintained throughout the entire cutting operation by the advancing stroke movement of the cutting blade 20 to thereby effectively and efficiently sever the workpiece W into sections at the predetermined point.

It has been found that by virtue of the use of the offset cutting edges 92 and 98 on the cutting blade 20 the power requirements of the actuator mechanism 16 are minimized. In other words, if the cutting edges 92 and 98 were not offset an exceptionally powerful actuator mechanism would have to be employed thereby reducing the effectiveness of the portability of the apparatus 10. Thus, the offset feature of the cutting edges 92 and 98 results in the cutting edges 92 of the blade 20 cooperating with the cutting edges 66 on the spaced frame members 24 to progressively sever the web portion of the workpiece by virtue of the arcuate shape of the cutting edges 92 while the offset cutting edges 98 on the blade member 20 cooperate with the longitudinally disposed cutting edges 64 on the spaced frame members 24 to sever the flange portions of the workpiece after the web section has been severed by the cooperation of the cutting edges 66 and 92.

In summary, it has been found that the aforedescribed apparatus can advantageously be used in numerous environments such as the underwater cutting of the excess length of pile driven beams that comprise part of a pier structure.

An advantageous embodiment of the invention has been shown and described. It would be obvious to those skilled in the art that various changes and modifications may be made therein without departing from the spirit and scope thereof as set forth in the appended claims, wherein:

What is claimed is:

1. In a portable cutting apparatus for severing a workpiece into given lengths, means on the apparatus for loosely and slidably disposing the apparatus about and holding the apparatus in engagement with the workpiece, said means including an apertured guide plate element insertable about the workpiece and roll means associated with the aperture in said guide plate element for slidably engaging the workpiece to be severed, movable cutting elements mounted on and disposed within said apparatus and at a preselected angle relative to the longitudinal axis of the workpiece, fixed cutting elements mounted on and disposed within said apparatus and cooperatively arranged relative to said movable cutting elements, means mounting said fixed cutting elements on the apparatus in such a fashion that said last mentioned means act in conjunction with both the fixed and movable cutting elements immediately prior to and during the cutting operation to hold the workpiece in a fixed and locked position within said apparatus and means for actuating said movable cutting elements and forcing said movable cutting elements through said workpiece.

2. A portable apparatus as set forth in claim 1 wherein said movable cutting elements comprise a first set of cutting elements and a second set of cutting elements, said second set of cutting elements being laterally offset and angularly disposed relative to each other as well as to said first set of cutting elements.

3. A portable apparatus as set forth in claim 2 wherein said first set of cutting elements is arranged to sever a first portion of the workpiece and said second set of cutting elements is arranged to sever another portion of the workpiece arranged at an angle to said first portion.

4. A portable apparatus as set forth in claim 1 wherein all of said cutting elements are disposed symmetrically about the longitudinal axis of said apparatus.

5. In a portable cutting apparatus of the type described for severing a workpiece into given lengths, means on the apparatus for loosely and slidably disposing the apparatus about the workpiece, said means including an apertured frame means and a pair of apertured guide plate means aligned with and resiliently interconnected to opposite sides of said apertured frame means, movable cutting elements slidably mounted on said frame means and at a preselected angle relative to the longitudinal axis of the workpiece, fixed cutting elements mounted on said frame means and cooperatively arranged relative to said slidably mounted and movable cutting elements, means mounting said movable cutting elements on the frame means in such a fashion that said mounting means act in conjunction with both the fixed and movable cutting elements immediately prior to and during the cutting operation to hold the workpiece in a fixed and locked position within said apparatus and means for actuating said movable cutting elements and forcing said movable cutting elements through said workpiece.

6. A portable apparatus as set forth in claim 5 wherein said movable cutting elements comprise a first set of cutting elements and a second set of cutting elements said second set of cutting elements being laterally offset and angularly disposed relative to each other as well as to said first set of cutting elements.

7. A portable apparatus as set forth in claim 5 wherein all of said cutting elements are disposed symmetrically about the longitudinal axis of said apparatus.

8. A portable apparatus as set forth in claim 6 wherein said first set of cutting elements is arranged to sever a first portion of the workpiece and said second set of cutting elements is arranged to sever another portion of the workpiece arranged at an angle to said first portion.

9. In a portable cutting apparatus as set forth in claim 1 including means resiliently mounting said guide plate element on the apparatus.

10. In a portable cutting apparatus as set forth in claim 5 including roll means associated with an aperture of one of said guide plate means for slidably engaging the workpiece to be severed.

11. In a portable cutting apparatus of the type described for severing a workpiece into given lengths, means on the apparatus for loosely and slidably disposing the apparatus about the workpiece, said means including interconnected and apertured frame and guide means, movable cutting elements slidably mounted on said frame means and at a preselected angle relative to the longitudinal axis of the workpiece, fixed cutting elements mounted on said frame means and cooperatively arranged relative to said slidably mounted and movable cutting elements, means mounting said movable cutting elements on the frame means in such a fashion that said mounting means act in conjunction with both the fixed and movable cutting elements immediately prior to and during the cutting operation to hold the workpiece in a fixed and locked position within said apparatus, means for actuating said movable cutting elements and forcing said movable cutting elements through said workpiece and spring means for resiliently connecting said guide and frame means and for biasing said guide means relative to said frame means.

12. A portable cutting apparatus as set forth in claim 11 including roll means associated with an aperture of said guide means for slidably engaging the workpiece to be severed.

References Cited
UNITED STATES PATENTS

| | | | |
|---|---|---|---|
| 625,289 | 5/1899 | Christie | 83—456 |
| 2,236,833 | 4/1941 | Pell et al. | 83—639 |
| 2,302,647 | 11/1942 | Temple | 30—228 |
| 3,039,343 | 6/1962 | Richards | 83—694 X |
| 3,056,267 | 10/1962 | McRee | 30—241 X |

WILLIAM FELDMAN, *Primary Examiner.*

J. C. PETERS, *Assistant Examiner.*